United States Patent Office 3,137,116
Patented June 16, 1964

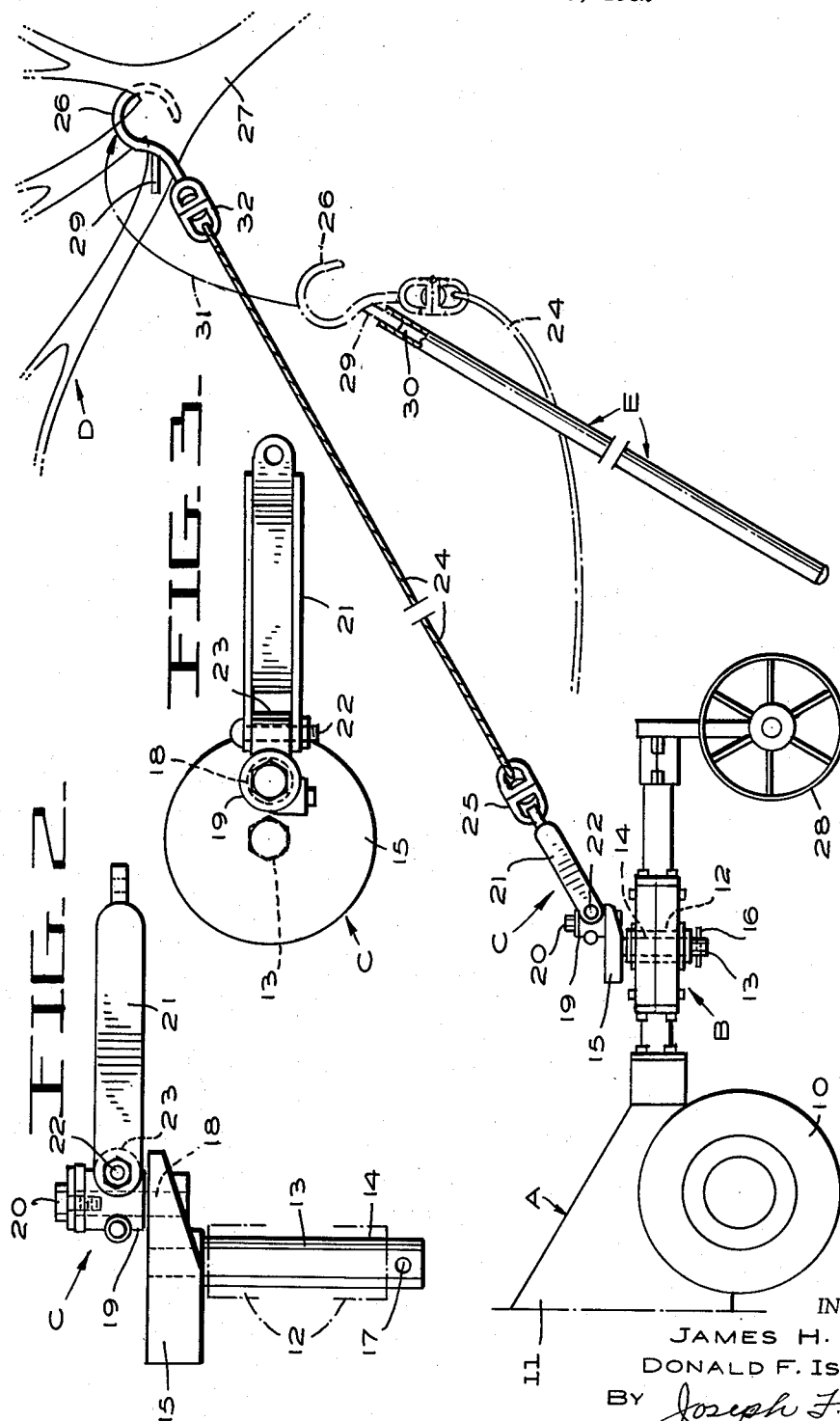

3,137,116
TREE SHAKER ATTACHMENT FOR A TRACTOR
James H. Besser, 205 Alameda Drive, and Donald F. Isaacson, The Canyon Farm, both of San Juan Bautista, Calif.
Filed Dec. 3, 1962, Ser. No. 241,689
5 Claims. (Cl. 56—328)

The present invention relates to improvements in a tree shaker attachment for a tractor. It consists of the combinations, constructions and arrangement of parts, as hereinafter described and claimed.

An object of our invention is to provide a tree shaker attachment which may be readily connected to a power take-off unit of a tractor, without requiring any modifications of the latter, and which may be operated to shake a tree in a highly efficient manner when harvesting a crop, for instance walnuts. Of course, the use of our attachment is not to be limited to any particular type of crop being harvested from the trees.

More specifically described, we propose to provide a tree shaker attachment having a stub shaft that may be easily telescoped into a driven sleeve of a power take-off unit of a tractor. This shaft is adapted to operate a pitman through eccentric means, and a pull cable has its inner end connected to the pitman, while a hook is provided at an outer end of the cable for engagement over a selected limb of a tree. Moreover, the pitman is supported for universal movement so that it may swing laterally and into inclined positions so as to extend toward the selected limb of the tree.

Another object of our invention is to provide a firm support for the power take-off unit during the shaking of the tree, but which will permit the tractor to be moved about when the hook is to be engaged with different limbs of trees.

A still further object of our invention is to provide a pole that may be readily attached to the hook when lifting the latter into engagement with a selected limb, the pole being arranged to be detached from the hook during the shaking of the tree.

Other objects and advantages will appear as the specification proceeds. The novel features of the invention will be set forth in the appended claims.

Drawing

For a better understanding of the invention, reference should be had to the accompanying drawing, forming part of this specification, in which:

FIGURE 1 is a side elevational view of our tree shaker attachment for a tractor, illustrating it as being used to shake a selected limb of a tree;

FIGURE 2 is a side view of a portion of the attachment; and

FIGURE 3 is a top plan view of FIGURE 2 of the drawing.

Detailed Description

Referring now to the drawing in detail, we have shown a tractor designated generally at A which is provided with ground-engaging wheels 10 that may be driven by the engine 11 forming part of the tractor. Of course, the tractor A may be made of any suitable construction and we do not wish to be limited in this respect.

As shown in FIGURE 1, the tractor A is provided with a power take-off unit B having a substantially upright driven sleeve 12, the latter being turned by the engine 11 at a suitable speed.

Our tree shaker attachment for a tractor is designated generally at C in FIGURES 1 to 3, inclusive. This attachment is provided with a stub shaft 13 that may be removably telescoped into a bore 14 of the driven sleeve, with the shaft 13 being connected to the sleeve 12 so as to be turned by the latter. The stub shaft 13 and the bore 14 are both non-circular in cross-section, for instance, hexagonal, and the stub shaft has a sliding fit with the bore of the sleeve, whereby rotation of the sleeve will impart a corresponding rotation to the stub shaft.

It will be noted that a disc 15 is fixed to the stub shaft 13 for turning by the latter. This disc is disposed above the power take-off unit B, and the stub shaft 13 extends downwardly through the driven sleeve 12 to a position below the latter (see FIGURE 1). Any suitable means, for instance a pin 16 inserted through an opening 17 formed in the shaft 13, may be removably connected to the projecting lower end of the stub shaft so as to normally retain this shaft against being dislodged from the driven sleeve.

With particular reference to FIGURE 2, we show a substantially vertical journal shaft 18 which is secured to the disc 15 in eccentric relation with respect to the stub shaft 13 and projecting upwardly from this disc. Also, bearing collar 19 is rotatably mounted on the journal shaft 18 for turning about the vertical axis of the latter. A cap screw 20 may be screwed into the upper end of the shaft 18 so as to hold the collar 19 in a position on the journal shaft, while permitting free rotation of the bearing collar on the journal shaft.

It will be observed that a pitman 21 has an inboard end swingably attached to the bearing collar for swinging about a substantially horizontal axis defined by a bolt 22 that passes through the pitman and a lug 23 projecting from the bearing collar, whereby the pitman 21 may be freely swung into various inclined positions.

A pull cable 24, or the like, has an inner end anchored to an outboard end of the pitman 21 by a swivel 25 or a ring. The pitman is freely swingable about the journal shaft 18 so as to extend in various lateral directions. This cable has a hook 26 connected to an outer end thereof and adapted to be engaged over a selected limb 27 of a tree D, whereby the tree may be shaken when the stub shaft 13 is rotated.

As clearly shown in the drawing, the pitman 21 is disposed above the disc 15 and projects beyond the rim of the disc, whereby the cable 24 will not become entangled with the stub shaft 13 in the event that the cable should break or the hook 26 should become disengaged from the limb 27.

The power take-off unit B is mounted in front of the tractor A, with the ground-engaging wheels 10 of the tractor being disposed rearwardly of the power take-off unit. Auxiliary ground-engaging wheels 28 are disposed ahead of the power take-off unit to support the latter. Thus the tractor and auxiliary wheels 10 and 28, respectively, provide a firm support for the power take-off unit B during the shaking of the tree D.

As an important part of our tree shaker attachment, we provide a pole E for lifting the hook 26 into engagement with the selected limb 27. The upper end of this pole and the hook may be fashioned with suitable interengaging parts, whereby the pole may be removably connected to the hook for lifting the latter over the selected limb, and the pole may thereafter be disconnected from the hook during the shaking of the tree. For this purpose, the hook has been disclosed as having a shank 29 secured thereto and projecting therefrom, while the pole E has a socket 30 in its upper end (see FIGURE 1). The pole may be tubular to provide this socket.

After the shank 29 has been telescoped into the socket 30, the pole may be raised by the operator so as to move the hook 26 into engagement with the selected limb, as suggested by the arrow 31 in FIGURE 1. Then the pole may be disengaged from the shank 29 by pulling the pole E in a downward direction.

The outer end of the cable 24 may be attached to the hook 26 by a swivel 32, if desired, or by a ring. The swivels 25 and 32 will prevent the cable 24 from becoming entangled, and will facilitate placement of the hook over the selected limb. The pitman 21 has universal swinging movement relative to the disc 15 and thus a straight pull may be maintained on the cable during the operation of our attachment.

We claim:

1. The combination with a tractor provided with a power take-off unit having a substantially upright driven sleeve, the sleeve defining a bore extending axially therethrough, of a tree shaker attachment for the tractor comprising:
    (a) a stub shaft mounted in the bore of the sleeve, with this shaft being connected to the sleeve so as to be turned by the latter;
    (b) the shaft being freely insertable into the bore of the sleeve with a sliding fit by merely moving the shaft endwise downwardly into the bore, and the shaft being freely detachable from the sleeve by moving the shaft upwardly relative to the sleeve;
    (c) a disc positioned above the power take-off unit, and being fixed to the upper end of the shaft for turning by the latter;
    (d) a pitman disposed above the disc and having an inboard end attached to the disc in eccentric relation with respect to the shaft, with the pitman being universally swingable into various inclined and lateral positions so as to extend toward a selected tree limb;
    (e) a pull cable, or the like, having an inner end anchored to an outboard end of the pitman;
    (f) and a hook connected to an outer end of the pull cable, and being made to be engaged over the selected tree limb, whereby the tree will be shaken when the shaft is rotated.

2. The combination as set forth in claim 1;
    (g) and in which the shaft extends downwardly through the sleeve to a position below the latter;
    (h) and means removably connected to the projecting lower end of the shaft so as to normally retain this shaft against being dislodged from the sleeve.

3. The combination as set forth in claim 1;
    (g) and in which the shaft and the bore of the sleeve are both non-circular in cross-section and interfitting with one another to constitute the driving connection therebetween, whereby rotation of the sleeve will turn the shaft.

4. The combination as set forth in claim 1;
    (g) and in which the power take-off unit is mounted in front of the tractor in an unobstructed position;
    (h) the tractor having ground-engaging wheels disposed rearwardly of the power take-off unit;
    (i) and auxiliary ground-engaging wheels disposed ahead of the power take-off unit to support the latter;
    (j) the tractor and auxiliary wheels being spaced apart sufficiently to provide a firm support for the power take-off unit during the shaking of the tree.

5. The combination with a tractor provided with a power take-off unit having a substantially upright driven sleeve, the sleeve defining a bore extending axially therethrough, of a tree shaker attachment for the tractor comprising:
    (a) a stub shaft mounted in the bore of the sleeve, with this shaft being connected to the sleeve so as to be turned by the latter;
    (b) the shaft being freely insertable into the bore of the sleeve with a sliding fit by merely moving the shaft endwise downwardly into the bore, and the shaft being freely detachable from the sleeve by moving the shaft upwardly relative to the sleeve;
    (c) a disc positioned above the power take-off unit, and being fixed to the upper end of the shaft for turning by the latter;
    (d) a pitman disposed above the disc and having an inboard end attached to the disc in eccentric relation with respect to the shaft, with the pitman being universally swingable into various inclined and lateral positions so as to extend toward a selected tree limb;
    (e) a pull cable, or the like, having an inner end anchored to an outboard end of the pitman;
    (f) a hook connected to an outer end of the pull cable, and being made to be engaged over the selected tree limb, whereby the tree will be shaken when the shaft is rotated;
    (g) the shaft extending downwardly through the sleeve to a position below the latter;
    (h) means removably connected to the projecting lower end of the shaft so as to normally retain this shaft against being dislodged from the sleeve;
    (i) the shaft and the bore of the sleeve both being non-circular in cross-section and interfitting with one another to constitute the driving connection therebetween, whereby rotation of the sleeve will turn the shaft;
    (j) the power take-off unit being mounted in front of the tractor in an unobstructed position;
    (k) the tractor having ground-engaging wheels disposed rearwardly of the power take-off unit;
    (l) and auxiliary ground-engaging wheels disposed ahead of the power take-off unit to support the latter;
    (m) the tractor and auxiliary wheels being spaced apart sufficiently to provide a firm support for the power take-off unit during the shaking of the tree.

References Cited in the file of this patent

UNITED STATES PATENTS

| | | |
|---|---|---|
| 1,472,262 | Abildgaard | Oct. 30, 1923 |
| 1,999,957 | Chlupsa | Apr. 30, 1935 |
| 2,503,990 | Balsbaugh | Apr. 11, 1950 |
| 2,567,872 | Burke | Sept. 11, 1951 |
| 2,568,193 | Johnson | Sept. 18, 1951 |
| 2,656,669 | Avansino | Oct. 27, 1953 |
| 3,029,585 | Hess | Apr. 17, 1962 |
| 3,088,525 | Eastham | May 7, 1963 |

OTHER REFERENCES

"The Mechanical Tree Shaker," Diamond Walnut News, vol. 25, No. 4, July 1943, pp. 4–6.

Diamond Walnut News, November 1948, p. 10.